Sept. 28, 1937.  A. J. FUCHS  2,094,399
TRAILER LANDING GEAR AND FIFTH WHEEL ASSEMBLY
Filed Sept. 21, 1936  4 Sheets-Sheet 1
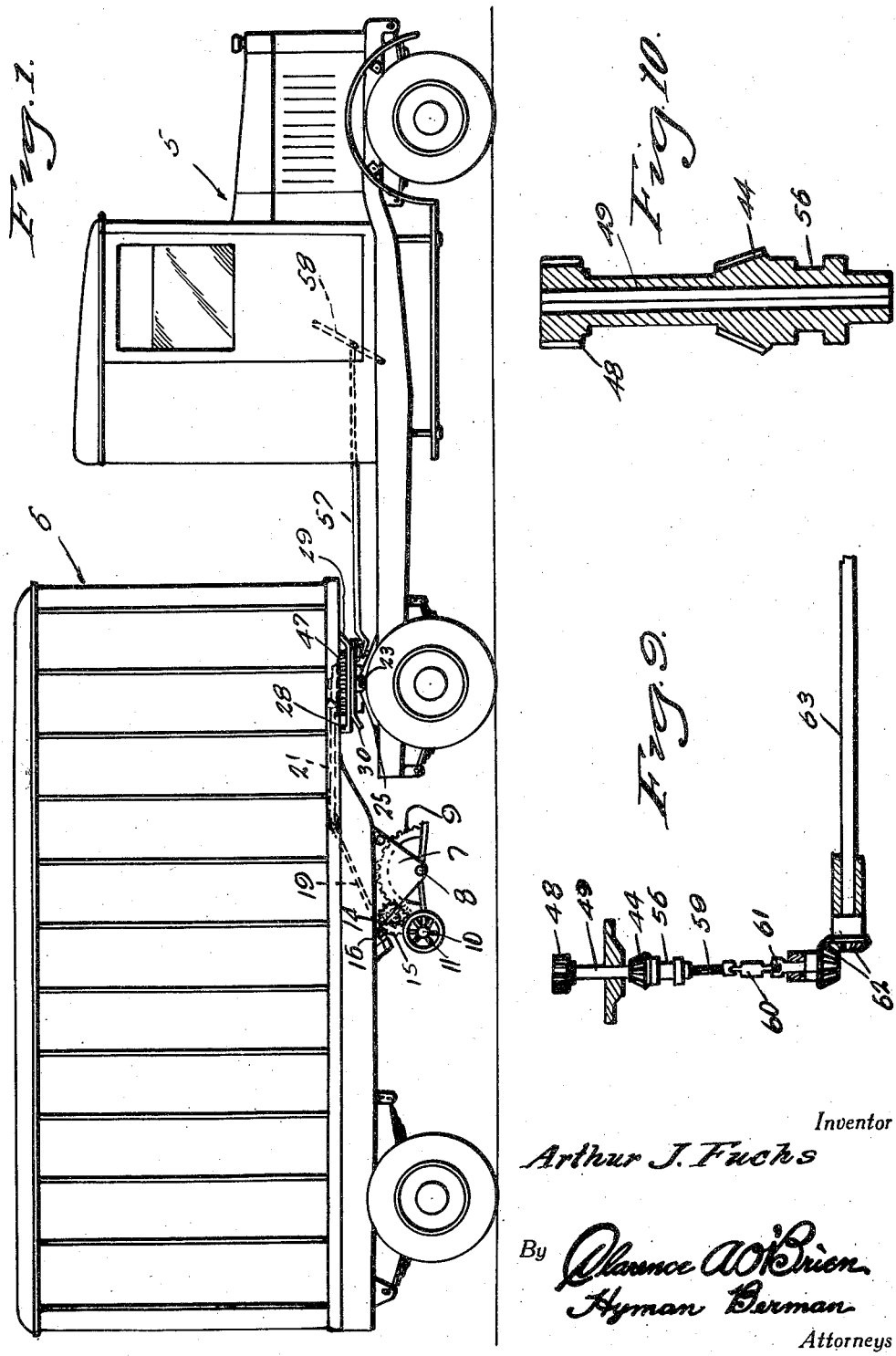
Inventor
Arthur J. Fuchs
By Clarence A. O'Brien
Hyman Berman
Attorneys Sept. 28, 1937.   A. J. FUCHS   2,094,399
TRAILER LANDING GEAR AND FIFTH WHEEL ASSEMBLY
Filed Sept. 21, 1936   4 Sheets-Sheet 2
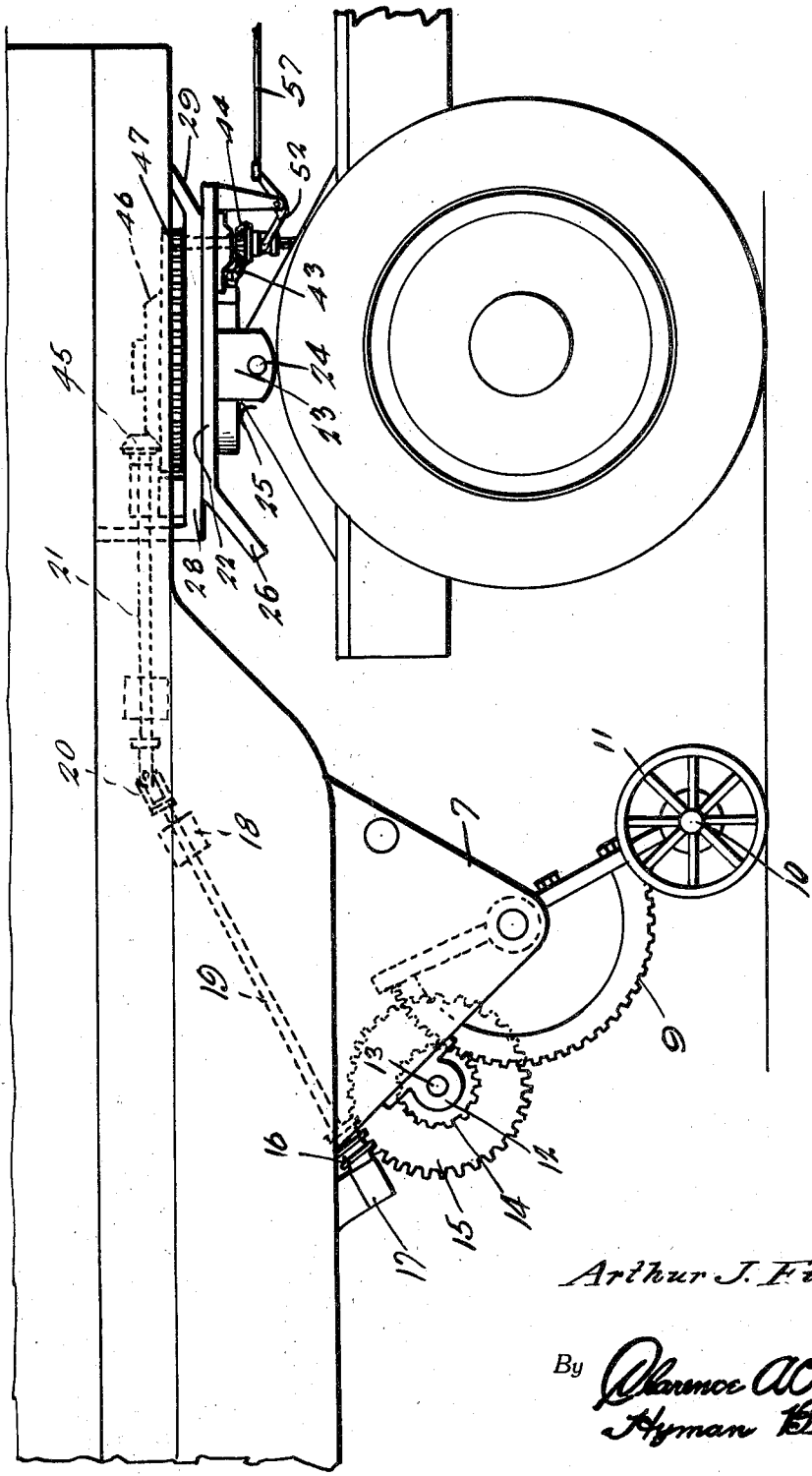
Inventor
Arthur J. Fuchs
By Clarence A. O'Brien
Hyman Berman
Attorneys

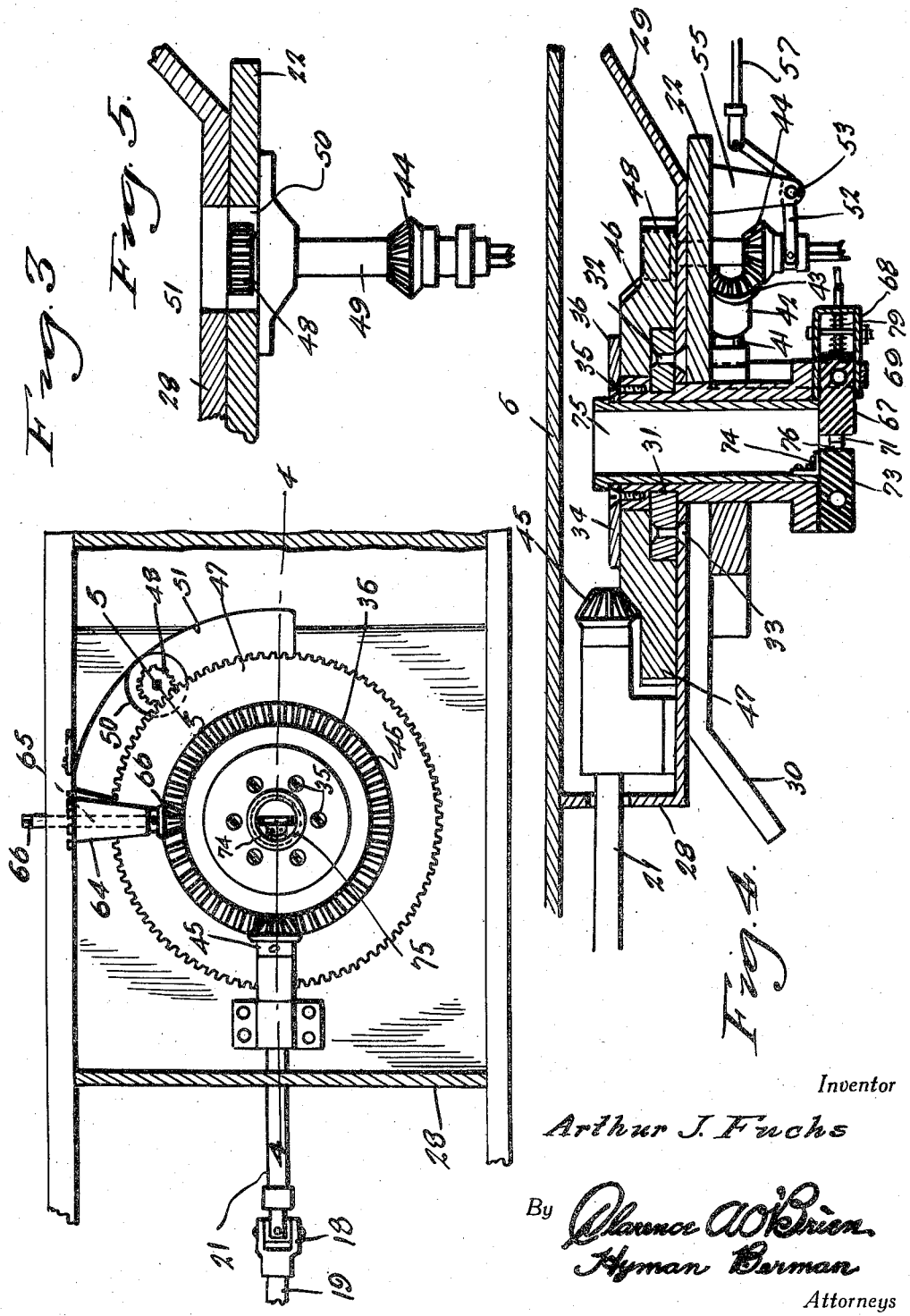

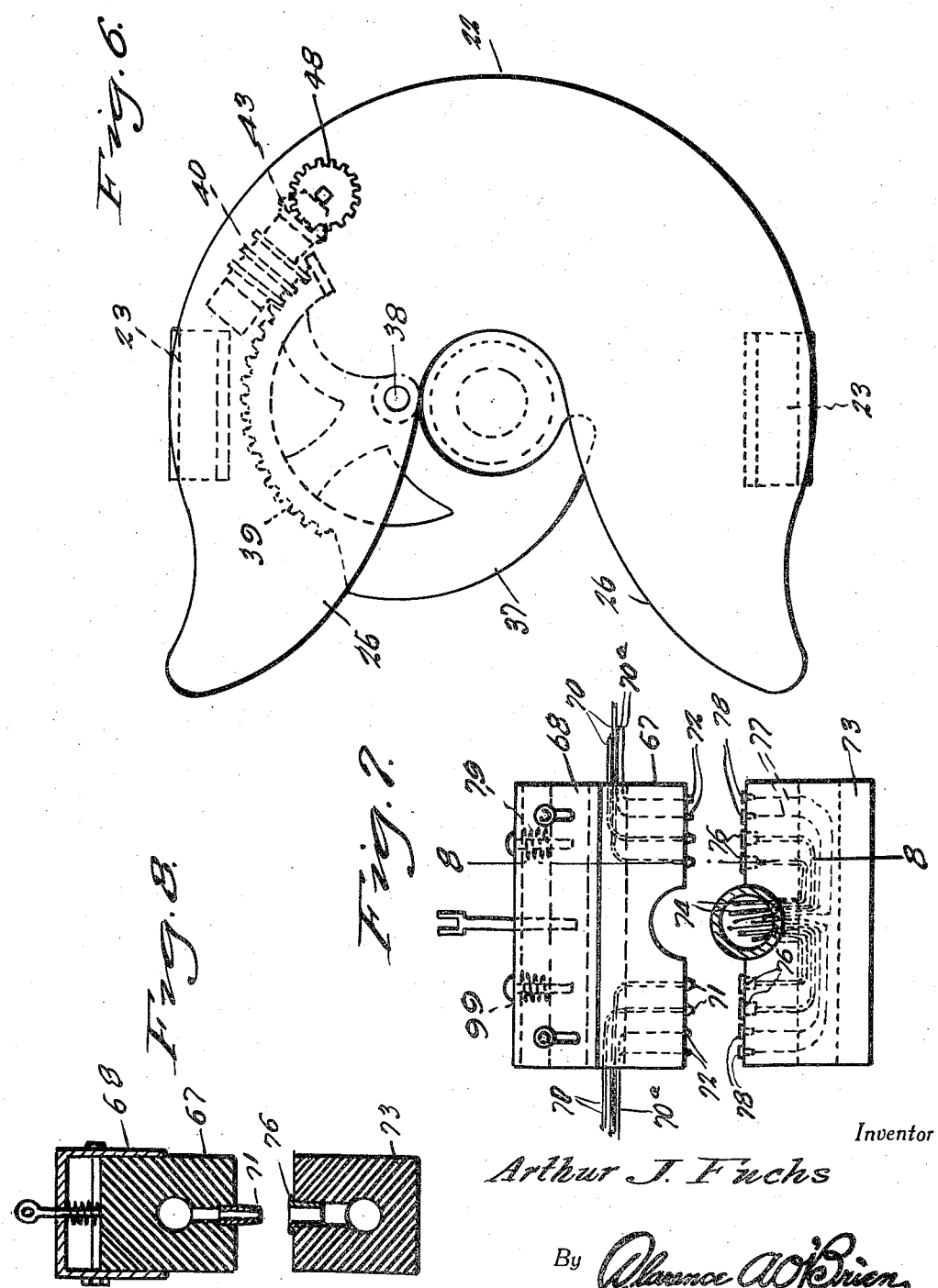

Patented Sept. 28, 1937

2,094,399

UNITED STATES PATENT OFFICE 2,094,399

TRAILER LANDING GEAR AND FIFTH
WHEEL ASSEMBLY

Arthur J. Fuchs, St. Louis, Mo.

Application September 21, 1936, Serial No. 101,842

5 Claims. (Cl. 280—33.1)

This invention has reference to an improved fifth wheel for detachably connecting a trailer or trailing vehicle to a lead vehicle; and also has reference to an improved landing gear, or supporting jack for a trailer or trailing vehicle; and the invention, together with its objects and advantages will be best understood from a study of the following description taken in connection with the accompanying drawings, wherein:—

Figure 1 is a side elevational view illustrating the application of the invention.

Fig. 2 is a side elevational view of the fifth wheel and landing gear showing the landing gear in lowered position to support the trailing vehicle uncoupled from the leading vehicle.

Fig. 3 is a detail view partly in section and partly in elevation illustrating certain features hereinafter more fully referred to.

Figs. 4 and 5 are detail sectional views taken substantially on the lines 4—4 and 5—5 respectively, of Fig. 3.

Fig. 6 is a top plan view of the fifth wheel.

Fig. 7 is a plan view of an assembly for connecting the air brake line and electrical wire associated with the trailing and leading vehicles and Fig. 8 is a sectional view taken substantially on the line 8—8 of Fig. 7.

Fig. 9 is a side elevational view of a gear and shaft assembly hereinafter more fully referred to, and Fig. 10 is a longitudinal sectional view through a vertically disposed gear equipped shaft.

Referring to the drawings by reference numerals it will be seen that 5 indicates generally the tractor or leading vehicle while 6 indicates generally the trailer or trailing vehicle.

Referring first to the improved landing gear or supporting jack for the trailer vehicle 6, it will be seen that the same comprises a pair of spaced apart depending plates 7 extending downwardly from the bottom of the trailer vehicle 6 slightly rearwardly of the forward end of the vehicle. Pivoted between the plates 7 as at 8 are a pair of rack segments 9 which at one end suitably support therebetween an axle 10 on which are journalled wheels 11.

The plates 7 are provided with bearings 12 in which are journalled the ends of a shaft 13 that is equipped with pinion gears 14 in mesh with the rack segments 9 and a main gear wheel 15.

The gear wheel 15 is in mesh with a worm 16 provided on a shaft, one end of which is journalled in a suitable bearing 17 and the other end of which is journalled in a suitable bearing 18. At the last named end thereof, the shaft 19 on which the worm 16 is provided has a universal connection 20 with a suitably mounted shaft 21 hereinafter more fully referred to.

From the foregoing it will be seen that when drive is transmitted through the shaft 21 to the shaft 19 for turning the worm 9, drive from the shaft 19 will be transmitted through the medium of the worm 16, gear 15, pinion 14, and rack 9 for swinging the wheels 11 either upwardly to the position shown in Fig. 1 or downwardly to the position shown in Fig. 2. In the last mentioned position of the wheels 11 the jack or landing structure just described will serve for supporting the forward end of the vehicle 6 when the latter is detached from the draft or leading vehicle 5.

Referring now to the fifth wheel structure for connecting the trailer vehicle 6 with the leading vehicle 5 it will be seen that in the preferred embodiment thereof said fifth wheel assembly includes a plate 22 provided at opposite sides thereof with lugs 23 that are pivoted as at 24 to spaced plates 25 rising vertically from the frame of the draft vehicle 5 at the rear end of the frame of said vehicle.

The plate 22 is formed to provide a pair of guide extensions 26 that are adapted to receive therebetween the hollow king bolt 27. As best shown in Fig. 4, the king bolt 27 depends from a bracket 28 suitably mounted on the under side of the vehicle 6 at the forward end of the latter and provided at its forward end with upwardly offset extensions 29 cooperating with downwardly offset extensions 30 of the arms 26 to facilitate the placing of the rear of the draft or leading vehicle 5 beneath the forward end of the trailer for trailing vehicle 6.

The upper portion of the king pin 26 extends through a suitable opening in the bracket plate 25 and is provided with a circumferential groove 31 which receives the complemental section of a collar 32 that is riveted or otherwise secured as at 33 to the bracket plate 28.

Also the upper end of the king pin or bolt 27 is accommodated within an aperture in the hub of a double gear 34. Secured by screws or other suitable fastening devices 35 to the upper end of the king pin or bolt 27 is a retaining plate 36 which rests on the hub of the gear assembly 34.

For releasably locking the lower end of the king pin or bolt 27 in the crotch of the plate arms 26 in a manner to positively couple the draft and trailer vehicles together, there is provided a retaining hook or jaw 37 that is pivoted to the underside of the plate 22 as at 38 and the member 37 has integral therewith a rack segment 39 that is in constant mesh with a worm 40 provided on a shaft 41 journalled in a suitable bearing 42 provided on the under side of the plate 22.

On one end of the shaft 41 is a beveled gear 43 with which is adapted to mesh a beveled gear 44 hereinafter more fully referred to for transmitting drive from a source of power to hook 37 for moving the hook into and out of the position shown in Fig. 6. With the hook 37 in the position shown in Fig. 6, it will be seen that the king pin 27 will be retained within the crotch of the plate arms or extensions 26 thus providing a positive fifth wheel coupling connection between the draft and leading vehicle.

For lowering the wheels 11 of the trailer supporting jack or landing gear incidental to a swinging of the hook 37 in a clockwise direction from the position shown in Fig. 6 so as to permit of an uncoupling of the vehicle, and also to swing the wheels 11 of the trailer supporting jack or landing gear upwardly to the position shown in Fig. 1, and out of contact with the ground simultaneously with a swinging of the hook 37 to the position shown in Fig. 6 on completing the coupling of the draft and trailer vehicles, there is provided on the shaft 21 a beveled gear 45 that is in constant mesh with a bevel gear 46 forming part of the double gear assembly 34. Also forming part of the double gear assembly 34 is a gear wheel 47.

Movable into and out of mesh with the gear wheel 47 is a pinion gear 48 provided on the upper end of a hollow shaft 49, on which shaft is also mounted preferably by being integral therewith the aforementioned beveled gear 44.

The gear equipped end 48 of shaft 49 is movable upwardly through an opening 50 in the plate 22, and through an arcuate slot 51 in the fifth wheel plate or bracket 28 to engage with the gear wheel 47 as will be clear from a study of Figs. 3 and 4.

For raising and lowering the shaft 49, there is provided a shifting boss 52 pivoted as at 53 on a depending bracket 55 provided and extending downwardly from the plate 22. The boss 52 is engaged with an integral grooved collar 56 provided on the shaft 49 below the gear 44. Also the fork 52 is connected through the medium of an operating rod or link 57 with a suitable hand lever 58 mounted within the cabin of the draft vehicle 5 and within convenient reach of the operator of the vehicle 5.

It will thus be seen that by properly manipulating the hand lever 58, the shaft 49 may be raised to place the gears 44 in mesh with gear 43 and pinion gear 48 in mesh with gear wheel 47 so that a turning movement will be imparted to the hook 37 of the fifth wheel assembly, at the same time drive is transmitted through the medium of the beveled gear 46, gear 45, shaft 21, shaft 19, and gearing 16, 15 to the rack bars 9 for raising or lowering the wheels 11 of the trailer vehicle jacks or landing gear.

The shaft 49 is provided with a squared boss which receives a squared shaft 59 that at its lower end has a universal connection 60 with a suitably mounted shaft 61.

Shaft 61 is driven through the medium of beveled gearing 62 from a suitably mounted shaft 63 and has suitable connections with the power take-off shaft of the draft vehicle 5. Thus it will be seen that with gear 44 in mesh with gear 43 and gear 48 in mesh with gear 47, drive will be transmitted to the rack segment of the hook 37 for swinging the hook, while at the same time drive from the power take-off shaft will be transmitted to the rack segment 9 of the supporting jack or landing gear to the end that the hook 37 will be swung either to the locking position shown in Fig. 6 and the wheels 11 of the landing gear moved downwardly into ground engaging position at one and the same time, or the hook 37 is caused to swing to a releasing position simultaneously with the swinging movement of the wheels 11 from a ground engaging position to the raised position shown in Fig. 1.

When desired instead of making use of the power take-off device of the vehicle 5 for shifting the position of the hook 37 or for raising or lowering the landing draft gear of the vehicle 6, hand power may be resorted to, there being provided a suitable bearing 64 as shown in Fig. 3, and in which bearing is journalled a shaft 65 on one end of which is a bevelled gear 66 that is in mesh with the beveled gear 46. On its outer free end the shaft 65 is squared as at 66 for the application of a handle or the like thereto, whereby the shaft 65 may be manually rotated for driving gear assembly 34 whereby to effect the simultaneous shifting of the hook 37 to the desired position and the raising or lowering, as the case may be, of the landing gear provided for the vehicle 6.

There is also provided a coupling device for the air brake lines and the conductor cables of the draft and trailer vehicles, and said coupling device comprises a coupling block 67 of conductive material slidably mounted in a channel member 68 suspended from the fifth wheel plate 22 through the medium of a U-shaped bracket 69.

The air brake lines 70 of the draft vehicle have end portions suitably accommodated in bores provided therefor in the coupling block 67 and the bores for the air lines 70 have extending from one end thereof male coupling elements 71. Also the electric conduits associated with the draft vehicle have their ends accommodated in bores provided therefor in the block 67 and at their terminals are equipped with male coupling elements 72 of conductive material.

Complemental to the block 67 is a block 73 of insulating material, and this block is bolted or otherwise secured as at 74 to the lower end of the king pin liner sleeve 75.

The conduits for the air brakes of the trailer vehicle 6 are indicated by the numeral 74 and extend through the king pin lining sleeve 75 and through suitable bores provided therefor in the block 73, and at their terminals are equipped with female coupling elements 76 complemental to the male coupling elements associated with the brake lines 70. Also the electric cables 77 of the trailer vehicle 6 extend through the liner sleeve 75 and have their ends accommodated in bores provided therefor in the block 73 and these cables are equipped at their terminals with female contact elements 78 complemental to the male contact elements 72 for electrically connecting the wires 77 with the wires 70a.

To insure the maintaining of a positive connection between the male coupling elements 71, 72 and the complemental female coupling elements 76, 78, there are provided suitable spring devices 79 as shown in Figs. 7 and 8, for urging the block 67 towards the block 73.

It is thought that a clear understanding of the construction, utility and advantages of the invention will now be had without a more detailed description thereof, it being understood that for hook 37 and double 47 respectively any suitable means may be provided to keep them in set position when the draft and trailer vehicles are coupled together. Also the air lines 74 may be provided with quick acting valves placed so as to close when the trailer and draft vehicles are disconnected.

Having thus described the invention, what is claimed as new is:—

1. In combination with a draft vehicle and a trailer vehicle, a supporting gear for the front end of the trailing vehicle pivotally mounted on said vehicle, a fifth wheel assembly for coupling the draft vehicle with the trailing vehicle and including a fixed plate mounted on the draft vehicle, a king bolt depending from the trailer vehicle and adapted to extend through said fixed plate, a hook member pivotally mounted on the under side of said fixed plate to engage the king bolt for retaining the same engaged with said fixed plate, and mechanism connected with said hook, and said supporting gear for simultaneously operating them whereby to effect simultaneously either a movement of the hook out of engaging position with the king bolt and a lowering of the draft gear into ground engaging position, or a movement of the hook into engaging position with the king bolt and a raising of the draft gear out of ground engaging position, optionally.

2. In combination with a draft vehicle and a trailer vehicle, a supporting gear for the front end of the trailing vehicle pivotally mounted on said vehicle, a fifth wheel assembly for coupling the draft vehicle with the trailing vehicle and including a fixed plate mounted on the draft vehicle, a king bolt depending from the trailer vehicle and adapted to extend through said fixed plate, a hook member pivotally mounted on the under side of said fixed plate to engage the king bolt for retaining the same engaged with said fixed plate, and mechanism connected with said hook, and said supporting gear for simultaneously operating them whereby to effect simultaneously either a movement of the hook out of engaging position with the king bolt and a lowering of the draft gear into ground engaging position, or a movement of the hook into engaging position with the king bolt and a raising of the draft gear out of ground engaging position, optionally, said mechanism including an integral gear wheel and beveled gear mounted on the trailer vehicle to rotate about the king bolt as an axis, a shaft rotatably supported on the trailer vehicle and provided at one end with a beveled gear connecting with the first-mentioned beveled gear, and a driving connection between said shaft and the aforementioned supporting gear for the trailer vehicle.

3. In combination with a draft vehicle and a trailer vehicle, a supporting gear for the front end of the trailing vehicle pivotally mounted on said vehicle, a fifth wheel assembly for coupling the draft vehicle with the trailing vehicle and incuding a fixed plate mounted on the draft vehicle, a king bolt depending from the trailer vehicle and adapted to extend through said fixed plate, a hook member pivotally mounted on the under side of said fixed plate to engage the king bolt for retaining the same engaged with said fixed plate, and mechanism connected with said hook, and said supporting gear for simultaneously operating them whereby to effect simultaneously either a movement of the hook out of engaging position with the king bolt and a lowering of the draft gear into ground engaging position, or a movement of the hook into engaging position with the king bolt and a raising of the draft gear out of ground engaging position, optionally, said mechanism including an integral gear wheel and beveled gear mounted on the trailer vehicle to rotate about the king bolt as an axis, a shaft rotatably supported on the trailer vehicle and provided at one end with a beveled gear connecting with the first-mentioned beveled gear, a driving connection between said shaft and the aforementioned supporting gear for the trailer vehicle, a shaft mounted on the draft vehicle for vertical shifting movement, a gear on the upper end of the said vertically shiftable shaft and movable therewith into and out of mesh with the first-mentioned gear wheel, a worm mounted on the draft vehicle, a rack integral with said hook and having constant mesh with said worm, a beveled gear on one end of said worm, and a beveled gear on said vertically movable shaft movable therewith into and out of mesh with the beveled gear associated with the said worm.

4. In combination with a draft vehicle and a trailer vehicle, a supporting gear for the front end of the trailing vehicle pivotally mounted on said vehicle, a fifth wheel assembly for coupling the draft vehicle with the trailing vehicle and including a fixed plate mounted on the draft vehicle, a king bolt depending from the trailer vehicle and adapted to extend through said fixed plate, a hook member pivotally mounted on the under side of said fixed plate to engage the king bolt for retaining the same engaged with said fixed plate, and mechanism connected with said hook, and said supporting gear for simultaneously operating them whereby to effect simultaneously either a movement of the hook out of engaging position with the king bolt and a lowering of the draft gear into ground engaging position, or a movement of the hook into engaging position with the king bolt and a raising of the draft gear out of ground engaging position, optionally, said mechanism including an integral gear wheel and beveled gear mounted on the trailer vehicle to rotate about the king bolt as an axis, a shaft rotatably supported on the trailer vehicle and provided at one end with a beveled gear connecting with the first-mentioned beveled gear, a driving connection between said shaft and the aforementioned supporting gear for the trailer vehicle, a shaft mounted on the draft vehicle for vertical shifting movement, a gear on the upper end of the said vertically shiftable shaft and movable therewith into and out of mesh with the first-mentioned gear wheel, a worm mounted on the draft vehicle, a rack integral with said hook and having constant mesh with said worm, a beveled gear on one end of said worm, a beveled gear on said vertically movable shaft movable therewith into and out of mesh with the beveled gear associated with the said worm, and manually operable means mounted on the draft vehicle and engaging the vertically movable shaft for raising and lowering the latter, and means operatively connected with said vertically shiftable shaft for driving the latter.

5. In combination with a draft vehicle and a trailer vehicle, a supporting gear for the front end of the trailing vehicle pivotally mounted on said vehicle, a fifth wheel assembly for coupling the draft vehicle with the trailing vehicle and including a fixed plate mounted on the draft vehicle, a king bolt depending from the trailer vehicle and adapted to extend through said fixed plate, a hook member pivotally mounted on the under side of said fixed plate to engage the king bolt for retaining the same engaged with said fixed plate, and mechanism connected with said hook, and said supporting gear for simultaneously operating them whereby to effect simultaneously either a movement of the hook out of engaging position with the king bolt and a lowering of the draft gear into ground engaging position, or a movement of the hook into engaging position with the king bolt and a raising of the draft gear out of ground engaging position, optionally, said mechanism including an integral gear wheel and beveled gear mounted on the trailer vehicle to rotate about the king bolt as an axis, a shaft rotatably supported on the trailer vehicle and provided at one end with a beveled gear connecting with the first-mentioned beveled gear, a driving connection between said shaft and the aforementioned supporting gear for the trailer vehicle, a shaft mounted on the draft vehicle for vertical shifting movement, a gear on the upper end of the said vertically shiftable shaft and movable therewith into and out of mesh with the first-mentioned gear wheel, a worm mounted on the draft vehicle, a rack integral with said hook and having constant mesh with said worm, a beveled gear on one end of said worm, a beveled gear on said vertically movable shaft movable therewith into and out of mesh with the beveled gear associated with the said worm, and manually operable means mounted on the draft vehicle and engaging the vertically movable shaft for raising and lowering the latter, means operatively connected with said vertically shiftable shaft for driving the latter, and a manually rotatable shaft supported on the trailing vehicle and provided at one end with a gear in constant mesh with the first-mentioned beveled gear whereby the first-mentioned beveled gear and gear wheel may be rotated by man power for effecting simultaneously a change in position of said hook and the supporting gear for the draft vehicle.

ARTHUR J. FUCHS.